United States Patent
Hirsbrunner et al.

(10) Patent No.: US 7,493,124 B2
(45) Date of Patent: Feb. 17, 2009

(54) METHOD AND APPARATUS FOR UPDATING INFORMATION WITHIN A COMMUNICATION SYSTEM

(75) Inventors: Alex P. Hirsbrunner, Bloomingdale, IL (US); Anatoly S. Belkin, Glenview, IL (US); Sandra R. Abramson, Monmouth County, NJ (US); David Chavez, Northglenn, CO (US); Steven M. Milton, Monmouth County, NJ (US); Leigh Chinitz, Wellesley, MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/077,301

(22) Filed: Mar. 10, 2005

(65) Prior Publication Data

US 2005/0261006 A1   Nov. 24, 2005

Related U.S. Application Data

(60) Provisional application No. 60/553,068, filed on Mar. 15, 2004.

(51) Int. Cl.
*H04Q 7/20* (2006.01)

(52) U.S. Cl. ............... 455/456.1; 455/432.1; 455/432.3; 455/435.1; 455/435.2; 455/436; 455/450; 455/456.2; 455/456.3; 455/456.5; 455/456.6; 455/41.2; 455/41.3; 455/574; 370/331; 370/338

(58) Field of Classification Search ...... 455/456.1–457, 455/414.1–414.3, 41.2, 41.3, 435.1, 436–444, 455/550.1–553.1, 432.1, 432.3, 435.2, 450, 455/574; 342/357.01, 357.07; 370/338, 370/331

See application file for complete search history.

(56) References Cited

U.S. PATENT DOCUMENTS

| | | | | |
|---|---|---|---|---|
| 5,610,969 | A * | 3/1997 | McHenry et al. | 455/435.2 |
| 6,052,597 | A * | 4/2000 | Ekstrom | 455/456.3 |
| 6,161,008 | A * | 12/2000 | Lee et al. | 455/415 |
| 6,362,778 | B2 * | 3/2002 | Neher | 342/357.07 |
| 6,614,769 | B1 | 9/2003 | Erlick et al. | |
| 6,879,838 | B2 * | 4/2005 | Rankin et al. | 455/456.6 |
| 6,965,948 | B1 * | 11/2005 | Eneborg et al. | 709/250 |
| 7,020,468 | B2 * | 3/2006 | Squibbs et al. | 455/445 |
| 2002/0037723 | A1 | 3/2002 | Roach | |
| 2002/0147008 | A1 | 10/2002 | Kallio | |
| 2003/0096621 | A1 * | 5/2003 | Jana et al. | 455/456 |

* cited by examiner

*Primary Examiner*—Stephen M D'Agosta
(74) *Attorney, Agent, or Firm*—Kenneth A. Haas; Steven A. May

(57) ABSTRACT

A method and apparatus is provided to update information within a first network (103) via a second network (102) when communication no longer exists with the first network. During operation the first network is accessed via a PSTN (108) message that is never answered by the first network. Based on the called number and caller-identification information, the first network updates its system information.

19 Claims, 3 Drawing Sheets

METHOD AND APPARATUS FOR UPDATING INFORMATION WITHIN A COMMUNICATION SYSTEM

CROSS-REFERENCE(S) TO RELATED APPLICATION(S)

The present application claims priority from provisional application Ser. No. 60/553,068, entitled "METHOD AND APPARATUS FOR UPDATING INFORMATION WITHIN A COMMUNICATION SYSTEM," filed Mar. 15, 2004, which is commonly owned and incorporated herein by reference in its entirety.

FIELD OF THE INVENTION

The present invention relates generally to updating information within a communication system, and in particular, to a method and apparatus for updating location information within a communication system.

BACKGROUND OF THE INVENTION

Cellular telephones are currently being developed to take advantage of local area network (LAN) capabilities when placing/receiving calls from within the local-area network. For example, Motorola Inc. is developing a dual-mode phone that operates using both a wireless LAN (WLAN) protocol and a cellular protocol (e.g., GSM, CDMA, . . . , etc.). During operation, the WLAN is utilized for placing/receiving calls within the user's WLAN, while a wide-area network (WAN) (preferably a cellular network) is utilized for placing/receiving calls outside the user's WLAN.

As is evident, seamless mobility needs to be provided when roaming between the local and wide-area networks. For seamless mobility, there must be no ambiguity as to a telephone's location. In order to assure that all calls to the WLAN are properly routed to a user's telephone when outside WLAN coverage, all location updates must be made prior to handing over from the WLAN to the WAN. This is because for the majority of WLAN network configurations, WLAN coverage cannot be relied on for the delivery of location updates to the location database once the hand-out to the WAN has been committed. For example, local RF conditions change so rapidly (such as a door closing) that the subscriber device may not have a chance to send a location update over the WLAN before switching to the WAN network. If the location update is not completed before loss of WLAN network coverage, then the WLAN location information will be incorrect. This results in incoming calls to the subscriber being routed incorrectly by the WLAN. Therefore, a need exists for a method and apparatus for updating information within a communication system that allows for such information to be updated even when losing WLAN coverage.

DETAILED DESCRIPTION OF THE DRAWINGS

To address the above-mentioned need a method and apparatus for updating mobile-unit attributes within a communication system is provided herein. In particular, a method and apparatus is provided to update mobile-unit attributes within a first network via a second network when communication no longer exists with the first network. During operation the first network is accessed via a PSTN telephone call that is never answered by the first network. Based on the called number and caller-identification information, the first network updates the mobile-unit attributes.

The present invention encompasses a method for updating information within a communication system. The method comprises the steps of receiving a message on a first network. The message is a message taken from the group consisting of a short message service (SMS) message, an email, an IP ping, a data call, a web request, a multimedia message, a push-to-talk call, and a call alert message. After receiving the message identification information is determined from the message and the identification information is associated with a particular mobile unit. Attribute information is then updated for the particular mobile unit based on an address of the received message.

The present invention additionally encompasses a method for updating a mobile-unit attribute within a communication system. The method comprises the steps of receiving a telephone call, determining identification information from the telephone call, associating the identification information with a particular mobile unit, and updating an attribute for the particular mobile unit without connecting the received telephone call.

Finally, the present invention encompasses an apparatus comprising a location database comprising location information for a mobile unit, a mapping database mapping caller identification information to a particular mobile unit, and a mobility manager receiving a call from the mobile unit, accessing the mapping database to associate caller identification information to the mobile unit, and updating the location database based on the call and the association.

Figure 1:
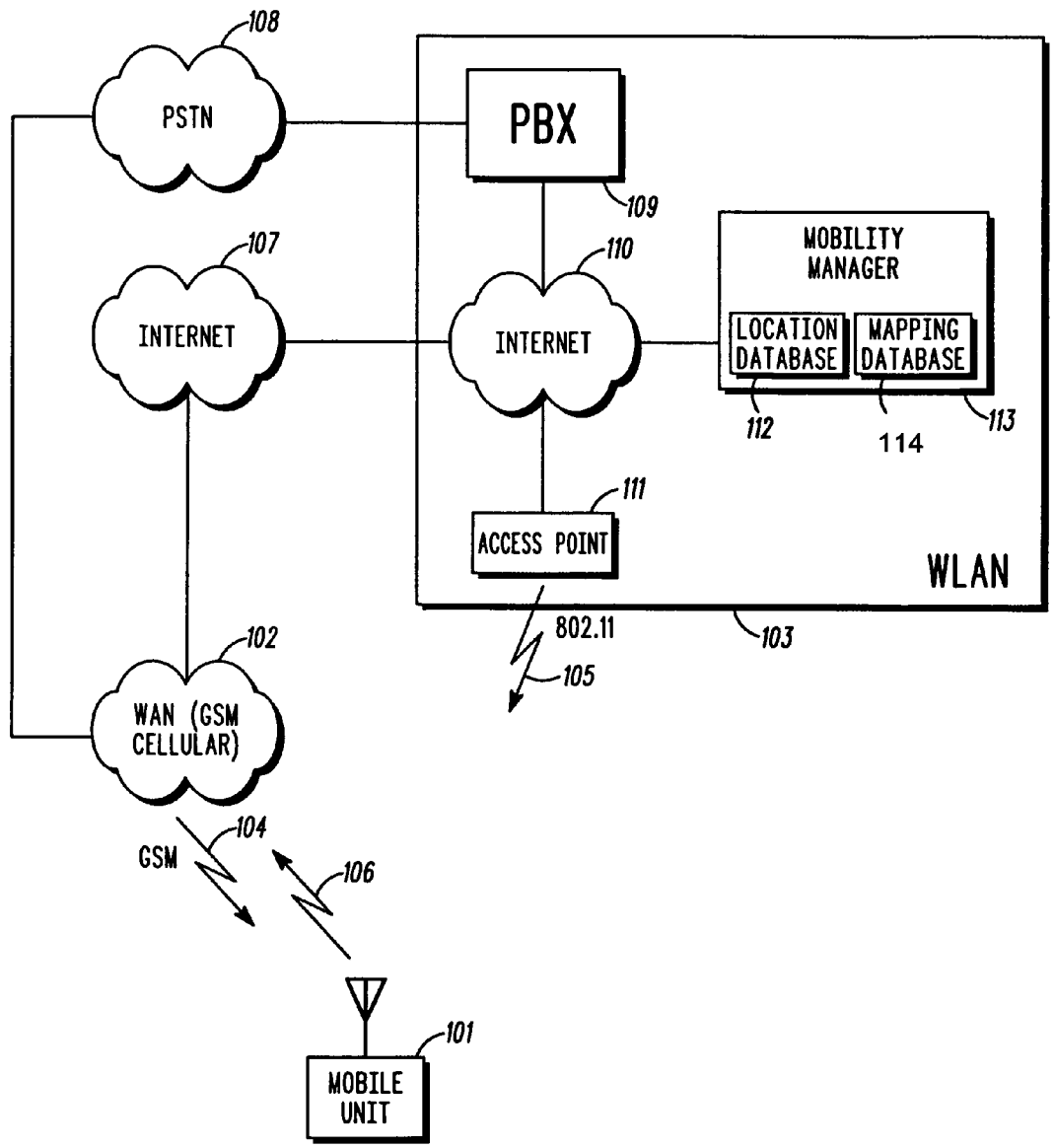
FIG. 1 is a block diagram of a wireless local-area network and a wide-area network.

Turning now to the drawings, wherein like numerals designate like components, FIG. 1 is a block diagram of wireless local-area network 103 and wide-area network 102. In the preferred embodiment of the present invention WAN 102 is preferably a cellular network such as but not limited to a cellular network employing the GSM system protocol. WLAN 103 is preferably a wireless internet protocol (IP) based network such as, but not limited to a WLAN employing the 802.11 protocol. Mobile unit 101 preferably comprises a dual-mode transceiver that is capable of communication with both WAN 102 or WLAN 103 via uplink communication signal 106. Similarly, both WAN 102 and WLAN 103 are capable of communicating with mobile unit 101 via downlink communication signals 104 and 105, respectively. It should be noted that while mobile unit 101 is preferably a dual-mode cellular telephone, one of ordinary skill in the art will recognize that mobile unit 101 may comprise other dual-mode devices such as, but not limited to a personal digital assistant (PDA), a personal computer, or any device (voice, data, or video) that can operate in dual mode loosely coupled systems.

As discussed above, during operation mobile unit 101 will utilize WLAN 103 when within the coverage area of WLAN 103, and will utilize WAN 102 when outside of the coverage area of WLAN 103. Thus, when in coverage of WLAN 103, mobile unit 101 will access WLAN 103 through any number of access points 111 (only one shown in FIG. 1). All uplink/downlink communications will be routed through enterprise intranet 110. More particularly, during voice calls to PSTN 108, data will be routed from mobile unit 101 to PBX 109 where it will be converted to circuit-switched data and routed through public-switched telephone network (PSTN) 108. In a similar manner, during data calls, data will be routed from mobile unit 101 to internet 107.

As is evident, WLAN 103 comprises mobility manager 113. During operation, mobility manager is constantly provided with location updates by mobile unit 101. These location updates typically comprise information on whether or not mobile unit 101 is currently accessing WLAN 102 as well as a currently-assigned IP address, however, in alternate embodiments of the present invention, location information may comprise information such as, but not limited to, a geographic location, a latitude/longitude, an identity of access point 111 in communication with mobile unit 101, . . . etc. Location information is stored within location database 112. Mobility manager 113 continuously updates the PBX 109 to properly address all incoming communications to the correct IP address for mobile unit 101.

When leaving the coverage of WLAN 103, mobile unit 101 will inform mobility manager 113 of this fact. More particularly, when mobile unit 101 senses that it is about to lose coverage with WLAN 103, it sends a de-registration message to WLAN 103 indicating that it can be reached via WAN 102. Mobile unit 101 then waits for an acknowledgment that WLAN 103 has heard the de-registration message. Upon hearing the de-registration message, mobility manager 113 will appropriately update all routing tables such that data/calls entering WLAN 103 from PSTN 108 will be re-routed by WLAN 103 to WAN 102, and eventually to mobile unit 101.

As discussed above, for seamless mobility between WAN 102 and WLAN 103, there must be no ambiguity as to a mobile unit's location. In order to assure that all calls to WLAN 103 are properly routed to mobile unit 101 when outside WLAN 103, all location updates must be made prior to handing over from WLAN 103 to WAN 102. If the location update is not completed before loss of WLAN network coverage, then location information within database 112 will be incorrect. This results in incoming calls to mobile unit 101 being routed incorrectly by WLAN 103.

In order to address this issue, in the preferred embodiment of the present invention WLAN 103 will be assigned a global location update PSTN telephone number that is known to all dual mode mobile subscribers. When RF conditions prevent using WLAN 103 to update the location information, mobile unit 101 will silently call this number. The PBX 109 will receive the call and take caller ID information (e.g., Signaling System 7 (SS7) information) from the incoming call. PBX 109 will not connect the call. PBX 109 will notify mobility manager 113 of the call by either forwarding the call to it or providing mobility manager 113 with the caller identification information. Mobility manager 113 will then determine the mobile unit's identity from the caller identification information and update location database 112 to reflect the fact that mobile unit 101 is no longer registered to WLAN 103. The call will then be disconnected.

The above solution provides a rapid and low-cost solution to informing WLAN 103 that mobile unit 101 is no longer registered with WLAN 103. More particularly, because the call to WLAN 103 is never connected, very little costs is associated with placing the de-registration call. Charging for cellular call begins when the far end party answers the call. Since Mobility Manger never answers the call, no charges are incurred by the cellular phone.

Figure 2:
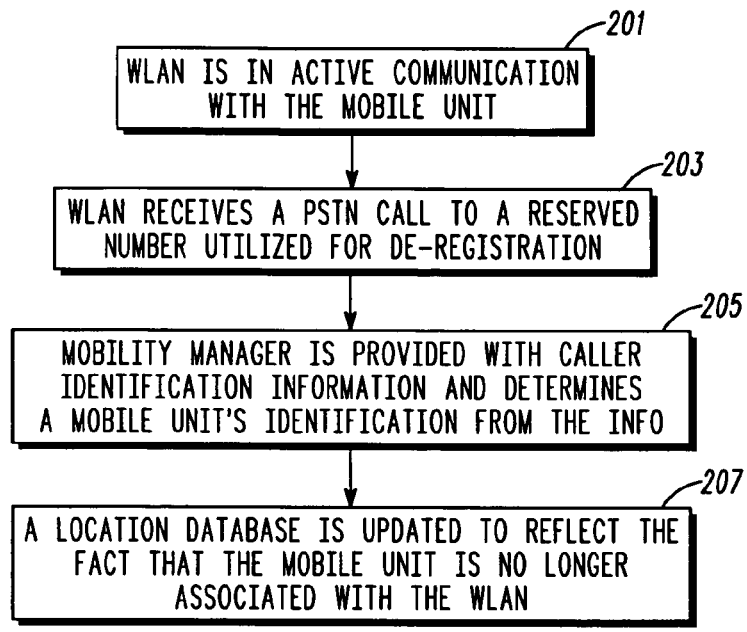
FIG. 2 is a flow chart showing operation of the wireless local area network of FIG. 1.

FIG. 2 is a flow chart showing operation of WLAN 103. As discussed above, when RF conditions prevent using normal de-registration procedures to update the location information for the mobile unit, the mobile unit will silently and automatically access WLAN 103 (i.e. without the user's knowledge) via WAN 102. In the preferred embodiment of the present invention a global location update PSTN number is assigned to PBX 109 and is known to all dual mode mobile subscribers, however, in alternate embodiments of the present invention the call may comprise any message to WLAN 103 placed from WAN 102, including messages such as a short message service (SMS) message, an email, an IP ping, a data call, a web request, a multimedia message, a push-to-talk call, and a call alert message.

The logic flow begins at step 201 where WLAN 103 is in active communication with mobile unit 101. As discussed above, communication takes place via a wireless communication system protocol through access point 111. Additionally, as part of communication with mobile unit 101, WLAN 103 is constantly updating location database 112 as to the location of mobile unit 101. At step 203, WLAN 103 receives a PSTN call to a reserved telephone number utilized only for de-registration purposes. Continuing, at step 205 mobility manager 113 is provided with caller identification information from the call and maps the caller identification information to mobile unit 101. In the preferred embodiment of the present invention this is accomplished by accessing mapping database 114. Mapping database comprises a simple table mapping caller identification information to a particular mobile unit. Once the mobile unit is determined from the caller identification information, location database 112 is updated to reflect the fact that mobile unit 101 is no longer associated with WLAN 103 (step 207).

It should be noted that updating location as described above may be easily accomplished only when a multi-modal location needs to be updated. In other words, when a location comprises only two states (i.e., associated with WLAN 103 or not), such information may be updated as described above. With this in mind, it should be noted that any multi-modal attribute may be updated in this manner.

Figure 3:
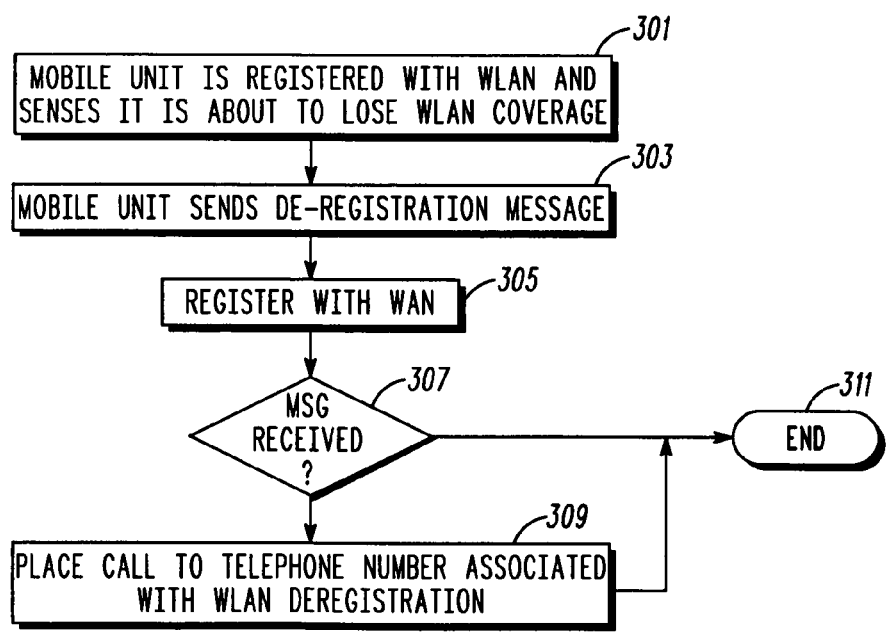
FIG. 3 is a flow chart showing operation of the mobile unit of FIG. 1

FIG. 3 is a flow chart showing operation of mobile unit 101. The logic flow begins at step 301 where mobile unit is registered to WLAN 103 and senses that it is about to lose WLAN coverage. At step 303, mobile unit 101 sends a de-registration message to WLAN 103 and waits for an acknowledgment that the message was received by WLAN 103. The logic flow continues to step 305 where mobile unit 101 registers with WAN 102. At step 307 it is determined if a de-registration acknowledgment was received from WLAN 103. If, at step 307, an acknowledgment was received from WLAN 103, then the logic flow ends at step 311, otherwise the logic flow continues to step 309 where mobile unit 101 calls a de-registration telephone number associated with WLAN 103. As discussed above, the call is never answered. The logic flow then ends at step 311.

As discussed, although the above description was provided showing system attributes being updated via the calling of a telephone number, in alternate embodiments of the present invention other forms for calling and accessing the local network are envisioned. For example, WLAN 103 may be updated by sending a short message service (SMS) call, email, IP ping, data call, web request, multimedia message, a push-to-talk call, call alert, or in general any way in which a handset can initiate a connection to a device in WLAN 103. During access, "from" address information is determined from the message and associated with a particular mobile unit. Based on the "to" address (i.e., number called, email address, private ID, . . . etc.), an attribute (e.g., location information) for the mobile unit is updated by WLAN 102. Thus the accessing of WLAN 103 from WAN 102 via any connection may be utilized to update multi-modal attributes for mobile unit 101.

Figure 4:
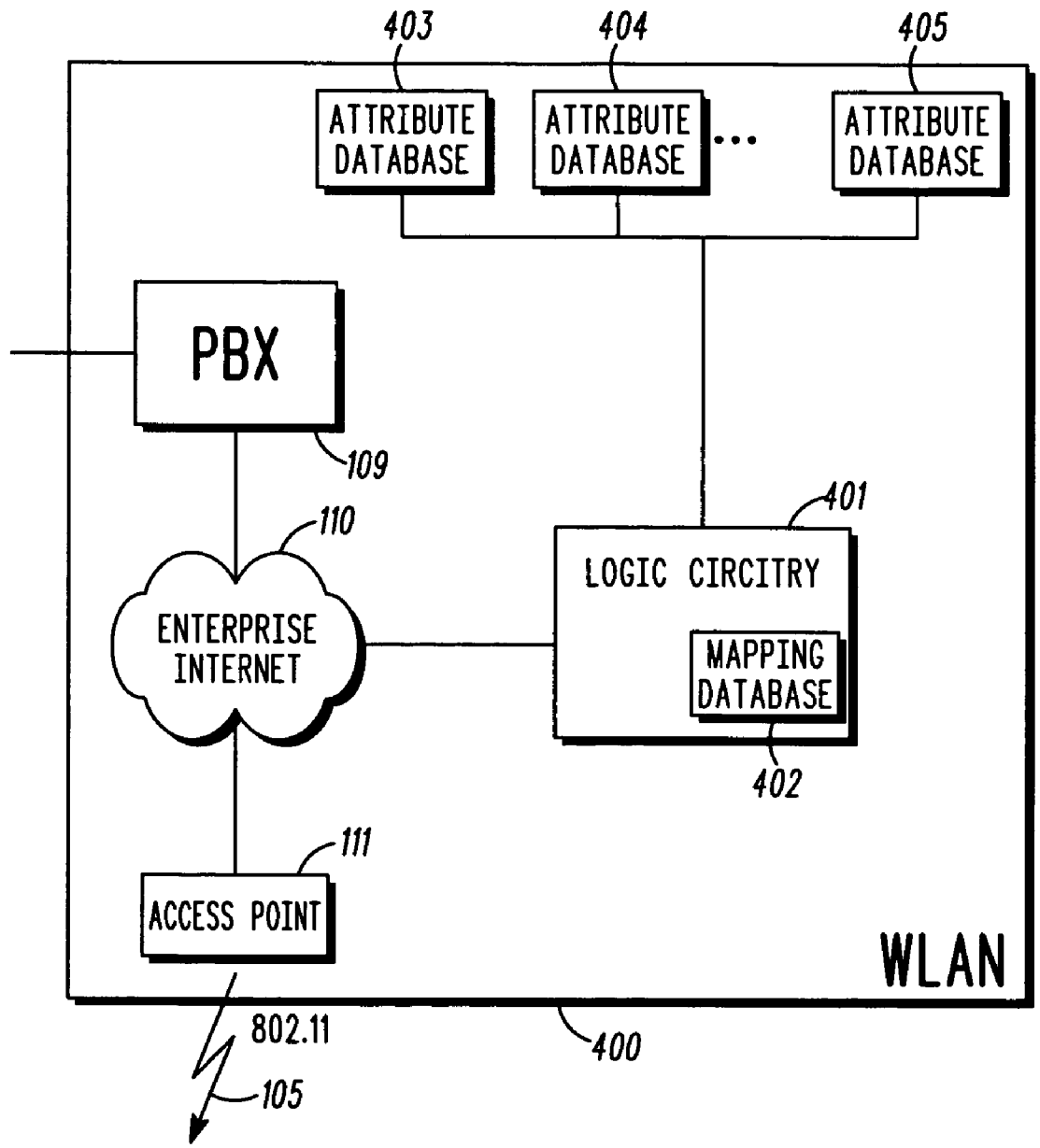
FIG. 4 is a block diagram of a local-area network and a wide-area network in accordance with an alternate embodiment of the present invention.

While the invention has been particularly shown and described with reference to a particular embodiment, it will be understood by those skilled in the art that various changes in form and details may be made therein without departing from the spirit and scope of the invention. For example, it is envisioned that WLAN 103 may be equipped with several differing addresses (e.g., email addresses, PSTN telephone numbers, . . ., etc.), with each address associated with a particular multi-modal attribute that needs to be updated. In this situation, logic circuitry would exist that would determine the "to" address and the "from" address from the incoming message. The "to" address is then mapped to a particular multi-modal attribute that needs to be updated, with the "from" address being mapped to a particular mobile unit. Such a system is shown in FIG. 4. As shown, WLAN 400 comprises logic circuitry 401 and a plurality of attribute databases 403-405. Additionally, for this example PBX 109 comprises a plurality of telephone numbers that are each associated with a multi-modal attribute that can be updated. When PBX 109 receives a call to one of the reserved telephone numbers, caller ID information along with the number called is passed to logic circuitry 401. Logic circuitry 401 accesses mapping database 402 and associates the called number to a particular multi-modal attribute that needs to be updated. The "from" information provided by the caller ID information is mapped to a particular mobile unit. Based on this, the attribute is updated for the mobile unit by updating an appropriate attribute database. As described above, the call is never answered.

The invention claimed is:

1. A method for updating information within a communication system, the method comprising the steps of:
    engaging, by a first wireless network, in a call with a mobile unit that wirelessly interfaces with the first wireless network;
    receiving a message from the mobile unit on the first wireless network, wherein the message was placed by the mobile unit utilizing a second wireless network wirelessly interfacing with the mobile unit and wherein the message is a message taken from the group consisting of a short message service (SMS) message, an email, an IP ping, a data call, a web request, a multimedia message, a push-to-talk call, and a call alert message;
    determining, by the first wireless network, identification information from the message;
    associating, by the first wireless network, the identification information with a particular mobile unit and with a particular mobile unit attribute that needs updating; and
    updating, of a database and by the first wireless network, location information for the particular mobile unit based on an address of the received message and to reflect the fact that the particular mobile unit is no longer associated with a Wireless Local Area Network (WLAN).

2. The method of claim 1 wherein the step of receiving the message comprises the step of receiving the message on a Wireless Local Area Network (WLAN), wherein the message was placed utilizing a Wide Area Network (WAN).

3. The method of claim 1 wherein the step of receiving the message comprises the step of receiving the message on a Wireless Local Area Network (WLAN), wherein the call was placed from a cellular network.

4. The method of claim 1 wherein the step of determining identification information from the message comprises the step of determining "from" address information from the message.

5. The method of claim 1, further comprising, prior to receiving the message from the mobile unit on the first wireless network which message was placed by the mobile unit utilizing the second wireless network, switching, by the mobile station, from the first wireless network to the second wireless network.

6. A method for updating a mobile-unit attribute within a communication system, the method comprising the steps of:
    receiving, by a first wireless network, a telephone call that was placed via a second wireless network;
    determining identification information from the telephone call;
    associating the identification information with a particular mobile unit and with a particular mobile unit attribute that needs updating; and
    updating, of a database and by the first wireless network, location information for the particular mobile unit based on routing information associated with the telephone call and without connecting the received telephone call.

7. The method of claim 6 wherein the step of updating the attribute comprises the step of updating a multi-modal location for the particular mobile unit.

8. The method of claim 6 wherein the step of receiving the telephone call comprises the step of receiving the telephone call on a first network, wherein the telephone call was placed utilizing a second network.

9. The method of claim 6 wherein the step of receiving the telephone call comprises the step of receiving a Public-Switched Telephone Network (PSTN) call.

10. The method of claim 6 wherein the step of receiving the telephone call comprises the step of receiving the telephone call on a Wireless Local Area Network (WLAN), wherein the telephone call was placed from a Wide Area Network (WAN).

11. The method of claim 6 wherein the step of receiving the telephone call comprises the step of receiving the telephone call on a Wireless Local Area Network (WLAN), wherein the telephone call was placed from a cellular network.

12. The method of claim 6 wherein the step of determining identification information from the telephone call comprises the step of determining Signaling System 7 information from the telephone call.

13. The method of claim 6 wherein the step of updating the attribute comprises the step of: updating location information for the mobile unit.

14. An apparatus for updating information within a communication system, the apparatus comprising:
    a first wireless network having:
        a location database that maintains location information for a mobile unit wirelessly interfacing with the first wireless network;
        a mapping database that maps caller identification information to a particular mobile unit; and
        a mobility manager that receives a call from the mobile unit that is placed utilizing a second wireless network that wirelessly interfaces with the mobile unit, accesses the mapping database to associate caller identification information to the mobile unit and with a particular mobile unit attribute that needs updating, and updates the location database based on routing information associated with the received call and to reflect the fact that the particular mobile unit is no longer associated with a Wireless Local Area Network (WLAN).

15. The apparatus of claim 14 wherein the call comprises a PSTN call.

16. The apparatus of claim 14 wherein the call comprises a call taken from the group consisting of a short message service (SMS), an email, an IP ping, a data call, a web request, a multimedia message, and a push-to-talk call.

17. The apparatus of claim 14 wherein the call is received on a Wireless Local Area Network (WLAN), and was placed utilizing a Wide Area Network (WAN).

18. The apparatus of claim 14 wherein the call is received on a Wireless Local Area Network (WLAN), and was placed from a cellular network.

19. The apparatus of claim 14, wherein a mobility manager receives the call from the mobile unit that is placed utilizing the second wireless network subsequent to the mobile unit switching from the first wireless network to the second wireless network.

* * * * *